United States Patent

[11] 3,530,761

| [72] | Inventor | Galen B. Erwin<br>Carthage, Missouri |
|---|---|---|
| [21] | Appl. No. | 674,189 |
| [22] | Filed | Oct. 10, 1967 |
| [45] | Patented | Sept. 29, 1970 |
| [73] | Assignee | Flex-O-Lators, Inc.<br>Carthage, Missouri<br>a corporation of Missouri |

[54] AUTOMATIC SHEARS
7 Claims, 6 Drawing Figs.

[52] U.S. Cl. .................................................. 83/644,
83/625, 83/636
[51] Int. Cl. .................................................. B26d 5/08,
B26d 5/12
[50] Field of Search .................................... 83/644,
625, 636, 639, 647.5

[56] References Cited
UNITED STATES PATENTS

| 1,565,654 | 12/1925 | Laukhuff ..................... | 83/644X |
| 2,350,540 | 6/1944 | Spiller et al. ................ | 83/644X |
| 2,649,153 | 8/1953 | Barley ......................... | 83/644X |
| 3,136,193 | 6/1964 | Gantz .......................... | 83/644X |
| 3,316,791 | 5/1967 | Greis et al. ................... | 83/644X |

*Primary Examiner*—Frank T. Yost
*Attorney*—John A. Hamilton

ABSTRACT: Automatic shears for cutting sheet material interposed between the elongated blades thereof, one of said blades being fixed and the other being movable and normally parallel to and spaced apart from the first, and having means whereby first one end and then the other end of said movable blade is moved into overlapping engagement with the fixed blade, whereby the cutting edges of said blades are disposed angularly to each other and the point of intersection of said edges moves progressively along the lengths of said blades.

Patented Sept. 29, 1970

INVENTOR.
Galen B. Erwin
BY John A. Hamilton
Attorney.

INVENTOR.
Galen B. Erwin
BY John A. Hamilton
Attorney.

AUTOMATIC SHEARS

This invention relates to automatic shears, and has particular reference to shears of the type commonly used for severing a moving web of sheet material into pieces of any desired length.

The type of shears most commonly used for the above purpose are of the "scissors" type, constituting a fixed blade and a movable blade pivoted at one end at the corresponding end of the fixed blade, the cutting edges of the blades moving in cooperating relationship as the movable blade is pivoted to sever a web moving between said blades transversely to the cutting line. Thus the web is cut progressively from one edge to the other, as the intersection of the blade edges moves from one end of the blades to the other. This "progressive" cutting of the web is desirable, as distinguished from a "chopping" cut in which the web is severed across its entire width at the same instant, for at least two reasons. First, it provides a cleaner cut so that the cut edges of the web are neater and more attractive, and second it reduces the power required to operate the shears. The present shears have been developed specifically for cutting a web or fabric heavily reinforced by spring steel wires woven therein, so that the power requirement is substantial.

However, difficulties have arisen with the type of shears described above, due principally to the time required to make a cut therewith. When the web is quite wide (often 100 inches or more), requiring long blades, the free end of the movable blade must move through a long stroke (for example 2 feet) to complete a cut. The power means for moving the blade, such as an air or hydraulic cylinder, requires an appreciable time to complete such a stroke. Therefore, the movement of the web must be arrested before operation of the shears, or the cut would not be square, that is, not accurately at right angles to the direction of travel of the web. Often, in a production line situation where severing of the web is only one of a series of operations being performed thereon, the slow speed of the shears is the limiting factor, or "bottleneck", determining how fast the web can move along the line. Even if the web is arrested only at the shears, so that it continues to move and "bunch up" behind the shears as the cut is being made, it can be allowed to bunch up only to a certain degree. If the shears could be operated at a higher speed, the entire production line could operate at a higher speed.

Accordingly, the principal object of the present invention is the provision of automatic shears of the general character described which, while operated by the same power units as heretofore, such as fluid cylinders, are capable of extremely fast operation, making a cut in a small fraction of the time heretofore required, and and at the same time maintain a progressive cutting action in which the web is cut from one longitudinal edge to the other. For many applications, the shears are sufficiently fast that movement of the web need not be arrested while the cut is made to insure an essentially "square" cut. Generally, this object is accomplished by making both of the two ends of the movable blade capable of moving toward the fixed blade, and moving said two ends sequentially rather than concurrently. For example, one end of the movable blade is moved toward and into cooperating relationship with the fixed blade, tilting the movable blade and completing a cut approximately one-half the width of the web, after which the other end of the movable blade is actuated to complete the cut. Even adding the strokes of both ends of the blade, the total will be substantially less than the stroke required of one end of the blade if one end thereof were pivoted and the other end movable. Thus even if the same fluid cylinders are used as heretofore, operating at the same speed, the time required to make a cut is greatly reduced. The speed advantage thus obtained is of course dependent on the length of the blades, becoming greater with longer blades.

Another object is the provision of shears of the character described having automatic means for regulating the timing of the sequential operation of the respective ends of the movable blade.

Other objects are simplicity and economy of construction, and efficiency and dependability of operation.

With these objects in view, as well as other objects which will appear in the course of the specification, reference will be had to the accompanying drawing wherein.

Figure 1:
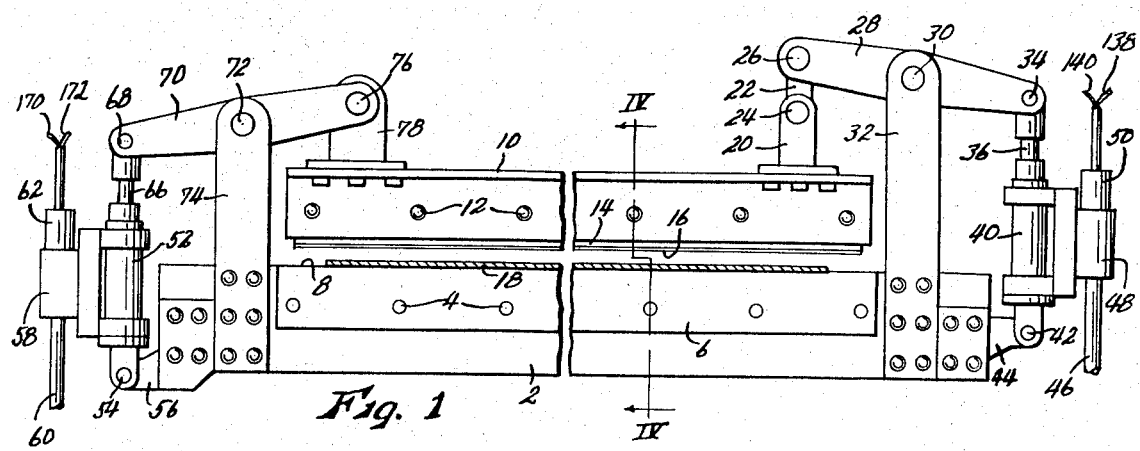
FIG. 1 is a front elevational view of a set of automatic shears embodying the present invention, partially broken away and foreshortened, showing a web to be severed disposed in operative relationship therein, prior to the commencement of a shearing operation.

Like reference numerals apply to similar parts throughout the several views, and the numeral 2 applies to a horizontal box-beam which may be rigidly positioned by any suitable means, not shown, and which serves as a frame on which the remaining elements of the shears are mounted. Fixed to the forward face of said beam, as by screws 4, is a blade 6 the cutting edge 8 of which lies generally in the plane of the top surface of beam 2, and extends therealong. Disposed above said fixed blade is a rigid carrier bar 10 to which is affixed, as by rivets 12, a blade 14 the cutting edge 16 of which is normally spaced above and generally parallel to the cutting edge 8 of fixed blade 6, so that a planar web 18 may be fed between said blades in a direction at right angles to their cutting edges. It will be seen that when movable blade 14 is lowered, by means to be described, it moves into overlapping planar engagement with fixed blade 6, severing web 18 between the cutting edges thereof.

To the right end of bar 10, as viewed in FIG. 1, there is affixed an upstanding bracket 20, to the upper end of which a link 22 is pivoted at 24. The upper end of said link is pivoted at 26 to the inner end of a rocker arm 28 which extends laterally outwardly. Said arm is pivoted intermediate its ends, as at 30, to the upper end of a support post 32 affixed at its lower end to beam 2, and is pivoted at its opposite end, as at 34, to the upper end of a piston rod 36 to which is affixed a piston 38 (see FIG. 5) operable in a fluid cylinder 40 which is pivoted, as at 42, to a bracket 44 affixed to beam 2. A conduit 46 furnishes operating fluid, such as hydraulic fluid or compressed air, to a control valve 48 which in turn supplies said fluid to cylinder 40, as will be described. Said valve is in turn operated by an electric solenoid 50, as will appear. Similarly, the left end of carrier bar 10, as viewed in FIG. 1, is operated by a fluid cylinder 52 pivoted at 54 to a bracket 56 affixed to beam 2, and having a control valve 58 supplied with operating fluid by a conduit 60 and operated by an electric solenoid 62. Cylinder 52 carries a piston 64 to which is affixed a piston rod 66 which projects upwardly and is pivoted at its extended end, as at 68, to the outer end of a rocker arm 70. Said rocker arm is pivoted intermediate its ends, as at 72, to the upper end of a support post 74 affixed at its lower end to beam 2, and the inner end of said rocker arm is pivoted at 76 to an upstanding ear 78 affixed to the left end of blade carrier bar 10. The use of link 22 between rocker arm 28 and ear 22 accommodates the slight variation in the distance between pivots 26 and 76 when the rocker arms and carrier bar 10 are tilted, as will presently appear. Thus it will be seen that whenever piston rods 36 and 66 are extended upwardly by delivery of operating fluid to the lower ends of cylinders 40 and 52, they will tilt rocker arms 28 and 70 to lower carrier bar 10 and blade 14 to move blade 14 in shearing relationship with fixed blade 6, whereby to sever web 18.

Figure 2:
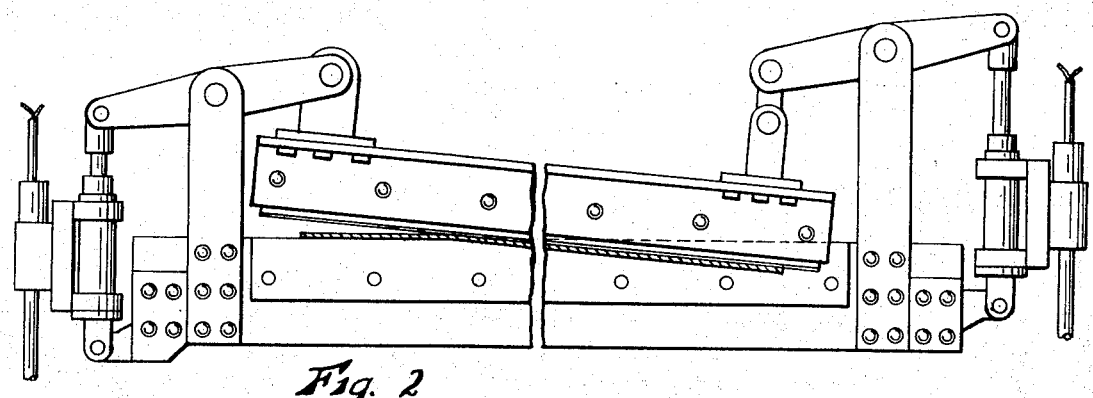
FIG. 2 is a view similar to FIG. 1, showing the positions of the parts after one end of the movable blade has been actuated.

The operation of the shears, briefly, is that the two ends of blade 14 are actuated and caused to move sequentially, rather than concurrently. Cylinder 40 is first actuated to lower the right end of movable blade 14 into shearing relation with fixed blade 6, as shown in FIG. 2. This moves the cutting edges of the blades into acutely angled relationship as the blades overlap, and the point of intersection of the cutting edges moves progressively from right to left as the movement continues. This provides the "progressive" cutting action as previously discussed, and avoids a "chopping" action. Then, after cylinder 40 has completed all or a portion of its stroke, cylinder 52 is actuated to lower the left end of the blade, while maintaining cylinder 40 in its extended position, or continuing its extension if it has not been yet fully extended. The parts then have the position shown in FIG. 3, web 18 having been fully severed. The principal feature of this operation is its speed. For example, assuming that both of the ends of the blade move two inches, making a total stroke (so far as time required therefor is concerned) of four inches, it will be seen that a movable blade carried at one end by a fixed pivot could require a stroke of easily two feet at its opposite end if the web were wide, say 100 inches, although the precise amount would of course depend on the blade opening desired at the start of the stroke (determined by the web thickness) and on the blade overlap at the end of the stroke. Thus, even if in both cases the movable blades are actuated by similar fluid pistons or other power devices having identical stroke speeds, the present invention reduces the time required to a small fraction of the time required in the other example given. Also, this is accomplished without sacrifice of the "progressive" or edge-to-edge cutting of the web, as is desirable for the reasons given above. Moreover, the speed of the cutting action may be still further increased by "overlapping" the strokes of the two ends of the movable blade, that is, by actuating left cylinder 52 before cylinder 40 has completed its stroke. However, there is a limit to the degree to which the two strokes can be overlapped, since the ultimate end of such adjustment would obviously be a condition in which both ends of the blade were moved simultaneously. This would "chop" the web rather than severing it progressively from one edge to the other, and is undesirable for the reasons previously discussed.

The operation of the shears will be discussed in greater detail in connection with a description of control systems therefor, as diagrammed in FIGS. 5 and 6. In those figures it will be seen that each control valve 48 and 58 has a cylindrical body member 80 in which a slide 82 is movably mounted, being normally biased upwardly therein by a spring 84, and being movable downwardly against said spring by its associated solenoid 50 or 62. Each of said solenoids has a coil 86 which when energized pulls an armature 88 therein, said armature being affixed to the associated valve slide 82. The control valves are generally standard and well known in the art, and for this reason will not be described in detail here. Suffice it to say that when the solenoid coil 86 of each valve is not energized and the slide 82 thereof is elevated by its spring 84, it serves to connect the compressed fluid line 46 or 60 thereof with the upper end of the cylinder 40 or 52 associated therewith, forcing the pistons 38 or 64 thereof downwardly to elevate the end of blade 14 to which that piston is connected, while venting to atmosphere the portions of the cylinders beneath the pistons. When the solenoid coil 86 of either control valve is energized to lower the slide 82 of the valve, fluid supply line 46 or 60 thereof is connected to the lower end of the cylinder 40 or 52 associated therewith, forcing the piston thereof upwardly to lower the associated end of blade 14, while venting the upper end of the cylinder to atmosphere. The control system is furnished with electric power from a pair of line wires 90 and 92, wire 92 being grounded at 94, and wire 90 being connected to one pole of a trigger switch 96 which is normally open, but which may be closed by an operating means 98 which may be actuated either manually, or mechanically by web 18 or by the mechanism, not shown, which propels the web, so that the shears will be activated to sever the web in pre-determined lengths. Also, when closed, switch 96 may be maintained closed by an electromagnet 100, as long as said electromagnet is energized.

Figure 5:
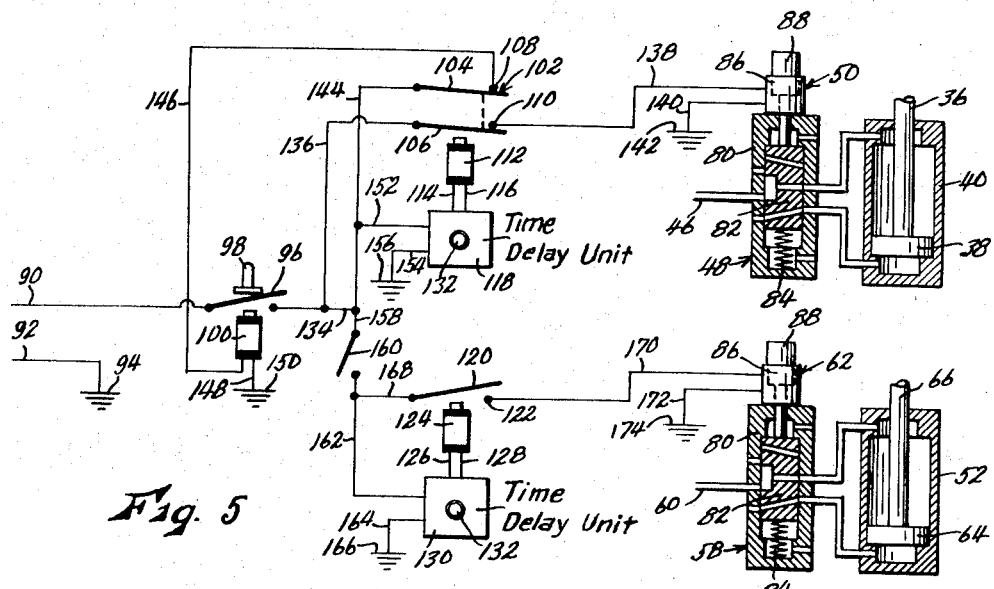
FIG. 5 is a schematic diagram of a preferred control system for the shears.

Referring specifically to the control system diagrammed in FIG. 5, it will be seen that it includes in addition a single-throw, double-pole switch 102 having poles 104 and 106 which are normally closed respectively on fixed contacts 108 and 110, but which may be opened simultaneously by the energizing of an electromagnet 112. Said electromagnet is furnished with power through wires 114 and 116 from a time delay unit 118 which is operable to energize the magnet a predetermined time after electric power is supplied to the time delay unit itself. Also included is a single pole switch 120 which is normally open but which may be closed on contact 122 by an electromagnet 124 furnished with power through wires 126 and 128 from a time delay unit 130 similar to unit 118. Said time delay units are well known and are not here detailed. They may be either mechanical or electronic in nature, but have the function, wherever energized, of energizing of the associated electromagnet after a predetermined time delay, and of re-setting themselves whenever they are de-energized to provide the same delayed energizing of the electromagnets whenever they themselves are next energized. The time delay furnished by each unit is adjustable, as represented by a manual adjusting knob 132 thereon.

When trigger switch 96 is closed momentarily, current is supplied from line wire 90 through switch 96, wires 134 and 136, pole 106 and contact 110 of switch 102, wire 138, coil 86 of solenoid 50, and wire 140 to ground at 142. Solenoid 50, thus energized, operates control valve 48 to supply compressed air or the like to the lower end of cylinder 40, elevating piston 38 therein to lower the right end of movable blade 14 as shown in FIG. 2, whereby to sever web 18 progressively from its right edge to a point intermediate its edges. Closure of switch 96 also completes a circuit through wires 134 and 144, pole 104 and contact 108 of switch 102, wire 146, electromagnet 100 and wire 148 to ground at 150, energizing said magnet to hold switch 96 closed until switch 102 is again opened, even though actuating means 98 of said switch is then released. Closure of switch 96 also completes a circuit through wires 134, 144 and 152, time delay unit 118 and wire 154 to ground at 156, and through wires 134, 158, a manually operable selector switch 160 (then closed), wire 162, time delay unit 130 and wire 164 to ground at 166. Both time delay units 118 and 130 are then energized, but do not immediately energize magnets 112 and 124, due to their delay characteristics. Unit 118 has a longer delay than unit 130.

Figure 3:
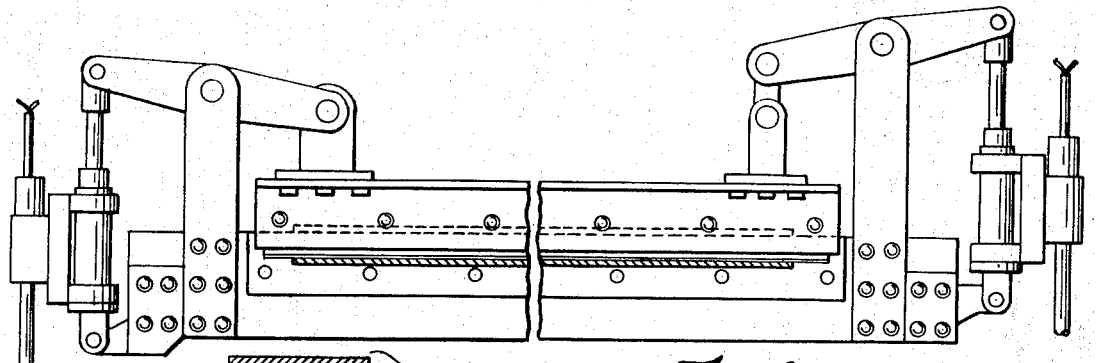
FIG. 3 is a view similar to FIG. 2, showing the positions of the parts after the second end of the movable blade has been actuated to complete the shearing operation.
Figure 4:
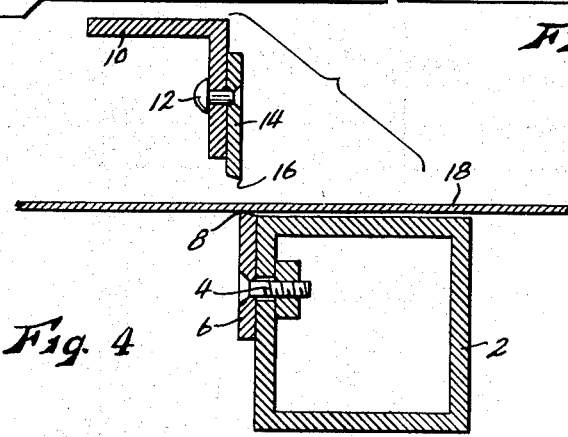
FIG. 4 is an enlarged sectional view taken on line IV—IV of FIG. 1.

After the time delay established by unit 130, which need be no longer than the time required for the right end of blade 14 to complete its stroke, said unit 130 energizes magnet 124 through wires 126 and 128, whereby to close switch 120. This completes a circuit from switch 96 through wires 134 and 158, selector switch 160, wires 162 and 168, pole 120 and contact 122, wire 170, coil 86 of solenoid 62 and wire 172 to ground at 174. Solenoid 62 thereupon actuates control valve 58 to deliver compressed air or the like to the lower end of cylinder 52, elevating piston 64 to lower the left end of blade 14 as shown in FIG. 3, completing the progressive severing of web 18 to the left edge thereof. After a time delay sufficient to permit the left end of the blade to complete its stroke, time delay unit 118 functions to energize magnet 112, opening switch 102. The opening of pole 106 of said switch interrupts the circuit to solenoid 50, and the opening of pole 104 interrupts the holding circuit to magnet 100, allowing switch 96 to open, interrupting all electric power to the system. Control valve slides 82 are then elevated by springs 84, setting said valves to deliver compressed air to the upper ends of cylinders 40 and 52, lowering pistons 38 and 64 to raise both ends of blade 14 to the FIG. 1 position. Also, time delay units 118 and 130 automatically reset themselves to operate with the same time delay periods the next time they are energized, and the system is again ready for a similar operating cycle the next time switch 96 is closed.

The speed of operation of the shears may be still further increased by overlapping the strokes of the two ends of blade 14, that is, by setting time delay unit 130 to begin actuation of cylinder 52 when cylinder 40 has only partially completed its stroke. The delay interval of unit 118 may then be correspondingly reduced to energize magnet 112 at the earlier completion of the stroke of cylinder 52. As previously discussed, this overlapping of the strokes is limited by the fact that if they overlap too greatly, the two ends of the blade 14 move so closely in unison that its action may tend to "chop" web 18, severing it all the way across at the same instant rather than with the desired progressive cutting action. The permissible degrees of overlapping will therefore be limited by the thickness and toughness of the web.

If switch 160 is opened, only the right end of the blade will be actuated, the left end remaining elevated at all times and the right end returning to its elevated position after the time delay established by unit 118. This type of action may be desired in cutting narrow webs, where the web width is no greater than the length of those portions of the blades which move in cooperating shearing relation in response to movement of only the right end of blade 14. In this case, the delay interval of unit 118 may be still further reduced, since its energization of magnet 112 need not be delayed until cylinder 52 has completed any portion of its stroke.

Figure 6:
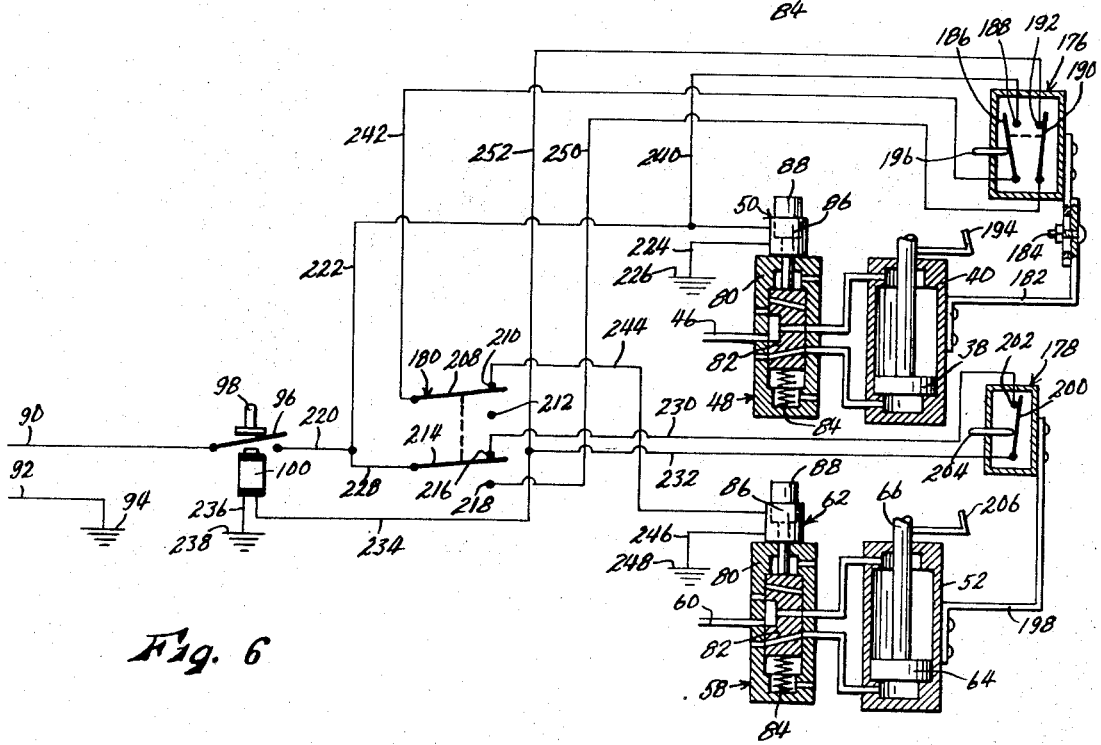
FIG. 6 is a schematic diagram of a modified control system for the shears.

FIG. 6 shows a modified control system wherein the sequential operation of the cylinders 40 and 52 is mechanically controlled by the position of each piston in its stroke. This system includes switches 176, 178 and 180. Switch 176 is mounted directly on cylinder 40 by means characterized by bracket 182, said bracket being adjustable by means of bolt 184 to vary its position with regard to piston rod 36 of said cylinder. Said switch includes a pole 186 which is normally open but is adapted to be closed on contact 188, and a pole 190 normally closed on contact 192. A finger 194 mounted on piston rod 36 is operable whenever piston 38 has completed its stroke, or a portion thereof depending on the adjustment of bracket 182 by bolt 184, to engage an operating button 196 of the switch, whereby to close pole 186 and open pole 190 thereof. Switch 178 is mounted on cylinder 52 by means characterized by bracket 198, and includes a pole 200 normally closed on contact 202, and has an operating button 204 which is engageable by a finger 206 mounted on piston rod 66 to open pole 200 whenever piston 64 completes its stroke. Switch 180 is a manually operable selector switch of the double-pole, double-throw type having a pole 208 cooperating selectively with fixed contacts 210 and 212, contact 212 being blind, and a pole 214 cooperating selectively with fixed contacts 216 and 218.

Assuming that switch 180 is in the position shown, with pole 208 closed on contact 210 and pole 214 closed on contact 216, it will be seen that whenever trigger switch 96 is closed momentarily, a circuit from said switch is completed through wires 220 and 222 through coil 86 of solenoid 50, and wire 224 to ground at 226, causing actuation of the right end of blade 14 as heretofore described. Closure of switch 96 also completes a circuit through wires 220 and 228 pole 214 and contact 216 of switch 180, wire 230, switch 178 (then closed), wires 232 and 234, magnet 100 and wire 236 to ground at 238. Magnet 100, thus energized, holds switch 96 closed. When piston 38 has completed its stroke, or only a portion of its stroke if it is desired to overlap the strokes of the two cylinders as heretofore described, finger 194 of piston rod 36 engages operating button 196 of switch 176, closing pole 186 on contact 188 and opening pole 190. The opening of pole 190 has no effect at this time, contact 218 of switch 180 being open, but closure of pole 186 completes a circuit from switch 96 through wires 220, 222, and 240, contact 188 and pole 186 of switch 176, wire 242, pole 208 and contact 210 of switch 180, wire 244, coil 86 of solenoid 62, and wire 246 to ground at 248, thus actuating cylinder 52 to lower the left end of blade 14 as heretofore described. When cylinder 52 completes its stroke, finger 206 contacts operating button 204 of switch 178, opening said switch. This interrupts the holding circuit to magnet 100, allowing switch 96 to open, permitting the system to return to rest with blade 14 in its elevated position.

Manually adjusting selector switch 180 so that pole 208 thereof is open and pole 214 engages contact 218 provides operation of one end of the blade only, as heretofore described in connection with the control system of FIG. 5. The opening of contact 210 of switch 180 interrupts the supply of power to solenoid 62 of piston 52, while the closure of pole 214 of switch 180 on contact 218 causes the holding circuit for magnet 100 to be completed through wire 250, pole 190 and contact 192 of switch 176, and wires 252 and 234 to said magnet. Thus when cylinder 40 is actuated as described above and completes its stroke, the engagement of finger 194 with operating button 196 opens pole 190 of switch 176, interrupting the holding circuit of magnet 100 and returning the system to rest.

While I have shown and described certain specific embodiments of my invention, it will be readily apparent that many minor changes of structure and operation could be made without departing from the spirit of the invention as defined by the scope of the appended claims.

I claim:

1. Automatic shears comprising:
    a. an elongated fixed blade;
    b. an elongated movable blade normally spaced apart from said fixed blade;
    c. a pair of power operating means each interconnected with and operable to move one end of said movable blade into operative relationship with said fixed blade, whereby the cutting edges of said blades are moved into overlapping shearing relationship; and
    d. a control system operable when energized to actuate said pair of blade operating means non-simultaneously, whereby the cutting edges of said blades are moved into shearing relationship in angular relationship to each other, said control system including means operable, after both of said blade operating means have been actuated, to complete the operating stroke of said movable blade, to reverse said blade operating means to return said movable blade to its normal position spaced apart from said fixed blade, said control system also including selector means operable to cause said control system, when energized, to actuate only one of said blade operating means before returning said movable blade to its normal position.

2. Automatic shears comprising:
    a. an elongated fixed blade;
    b. an elongated movable blade normally spaced apart from said fixed blade;
    c. a pair of power operating means each interconnected with and operable to move one end of said movable blade into operative relationship with said fixed blade, whereby the cutting edges of said blades are moved into overlapping shearing relationship; and
    d. a control system operable when energized to actuate said pair of blade operating means non-simultaneously, whereby the cutting edges of said blades are moved into shearing relationship in angular relationship to each other, said control system including means for adjusting the interval between the actuation of said two blade operating means, whereby the strokes of the two ends of said movable blade may be caused to overlap to variable degrees.

3. Automatic shears comprising:
    a. an elongated fixed blade;
    b. an elongated movable blade normally spaced apart from said fixed blade;

c. a pair of power operating means each interconnected with and operable to move one end of said movable blade into operative relationship with said fixed blade, whereby the cutting edges of said blades are moved into overlapping shearing relationship; and d. a control system operable when energized to actuate said pair of blade operating means non-simultaneously, whereby the cutting edges of said blades are moved into shearing relationship in angular relation to each other, said control system comprising electrically powered actuating means for each of said blade operating means, each of said blade operating means functioning to advance the corresponding end of said movable blade through its operative stroke whenever said actuating means is energized, and to retract the corresponding end of said movable blade whenever said actuating means is de-energized, a trigger switch, electrically actuated holding means operable when energized to maintain said trigger switch closed, a first electric circuit including a source of electric power, said trigger switch, said holding means, and a normally closed holding switch, a second electric circuit including a source of electric power, said trigger switch, and the actuating means of one of said blade operating means, a third electric circuit including a source of electric power, said trigger switch, the actuating means of the other of said blade operating means, and a normally open control switch, a first switch operating means operable when actuated to open said holding switch, a first electrically operated time delay unit operable when energized to actuate said first switch operating means after a predetermined time delay, a second switch operating means operable when actuated to close said control switch, a second electrically operated time delay unit operable when energized to actuate said second switch operating means after a predetermined but lesser time interval, and fourth and fifth electric circuits each including a source of electric power, said trigger switch, and respectively including said first and second time delay units, whereby when said trigger switch is closed by any means, said first, second, fourth and fifth circuits are completed and the actuating means of said one blade operating means is energized, said third circuit is completed by closure of said control switch after a time delay established by said second time delay unit to energize the actuating means of the other of said blade operating means, and said first circuit is broken by the opening of said holding switch after a further time delay established by said first time delay unit, whereby all of said circuits are broken.

4. Automatic shears as recited in claim 3 wherein each of said time delay units has means for adjusting the time interval after which it will actuate the associated switch operating means.

5. Automatic shears as recited in claim 3 with the addition of a manually operable selector switch interposed in said third and fifth circuits, whereby the actuating means of said other operating means is de-activated when said selector switch is opened.

6. Automatic shears as recited in claim 3 with the addition of a manually operable selector switch interposed in said third and fifth circuits, whereby the actuating means of said other operating means is de-activated when said selector switch is opened, and wherein said first time delay unit is provided with means for adjustably regulating the time interval after which it will function to actuate said first switch operating means.

7. Automatic shears comprising:

a. an elongated fixed blade;

b. an elongated movable blade normally spaced apart from said fixed blade;

c. a pair of power operating means each interconnected with and operable to move one end of said movable blade into operative relationship with said fixed blade, whereby the cutting edges of said blades are moved into overlapping shearing relationship; and d. a control system operable when energized to actuate said pair of blade operating means non-simultaneously, whereby the cutting edges of said blades are moved into shearing relationship in angular relation to each other, said control system comprising electrically powered actuating means for each of said blade operating means, each of said blade operating means functioning to advance the corresponding end of said movable blade through its operative stroke whenever said actuating means is energized, and to retract the corresponding end of said movable blade whenever said actuating means is de-energized, a trigger switch, electrically actuated holding means operable when energized to maintain said trigger switch closed, a first electric circuit including a source of electric power, said trigger switch, said holding means, and a normally closed holding switch, a second electric circuit including a source of electric power, said trigger switch, and the actuating means of one of said blade operating means, a third electric circuit including a source of electric power, said trigger switch, the actuating means of the other of said blade operating means, and a normally open control switch, a first switch operating means mechanically responsive to the functioning of said one blade operating means and operable to close said control switch whenever the end of the movable blade associated with said one operating means has completed any predetermined portion of its operating stroke, second switch operating means mechanically responsive to the other of said blade operating means and operable to open said holding switch when the end of the movable blade associated with said other operating means has completed its operative stroke, a second normally closed holding switch having operating mechanically responsive to operation of said one blade operating means to open said second holding switch when the end of the movable blade associated with said one blade operating means has completed its operative stroke, and a selector switch operable in one position to complete said third circuit and to insert said first holding switch in said first circuit, and in another position to open said third circuit and to substitute said second holding switch for said first holding switch in said first circuit.